Patented Dec. 12, 1933

1,938,890

UNITED STATES PATENT OFFICE 1,938,890

METHOD OF MAKING IMIDES OF KETONES

Edgar C. Britton, Midland, Mich., and Fred Bryner, Berkeley, Calif., assignors to The Dow Chemical Company, Midland, Mich., a corporation of Michigan No Drawing. Application April 9, 1932
Serial No. 604,348

14 Claims. (Cl. 260—128)

The present invention concerns a new and improved method of making imides of ketones, particularly arylimides of aromatic ketones, said arylimides having the general formula:—

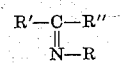

wherein R, R' and R'' represent residues selected from the class consisting of alkyl, aryl, and aralkyl groups.

Arylimides of aromatic ketones have, in the past, been made by a number of different methods, but none have proved satisfactory for the production of such compounds in large quantities. The method generally employed in preparing benzophenone anil, for example, is to heat a mixture of aniline and benzophenone to about 160° C. in the presence of anhydrous zinc chloride as a condensing agent. The yield of benzophenone anil, by such method, seldom exceeds 50 per cent of theoretical.

We have now found that an alkali metal or calcium salt of a primary amine may be reacted directly with a ketone to form the corresponding imide of the latter in comparatively high yield. The reaction involved is illustrated by the following equation:—

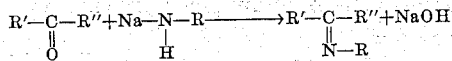

wherein R, R', and R'' represent hydrocarbon residues. The reaction is general to all ketones which do not contain substituents which are more reactive toward the alkali metal or calcium salt of a primary amine than is the keto group itself. The presence of highly reactive groups (e. g. nitro, hydroxy, acid, etc. groups) in either R or R', interferes, of course, with the smoothness of the reaction and may prevent the formation of the desired imide product. An alkali metal or calcium salt of any primary amine may be employed successfully as a reactant.

To the accomplishment of the foregoing and related ends, the present invention, then, consists of the method hereinafter fully described and particularly pointed out in the claims, the following description and the examples setting forth in detail several modes of carrying out the invention, such disclosed modes illustrating, however, but several of the various ways in which the principle of the invention may be used.

An alkali metal salt of a primary amine, which is to be employed as a reactant in forming an amide of a ketone according to the present method, is preferably prepared by heating and stirring an alkali metal, such as sodium or potassium, with more than its chemical equivalent of the desired primary amine in the presence of cuprous oxide as a catalyst. The reaction is preferably carried out in an inert atmosphere (e. g. hydrogen, nitrogen, the vaporized amine itself, etc.) and at a temperature above the melting point of the alkali metal used. Obviously, if an amine of low boiling point, e. g. ethyl amine, methyl amine, etc., is reacted in such manner, the reaction must be carried out within a closed reactor and preferably under pressure. When the higher boiling primary amines, e. g. aniline, paratoluidine, etc., are reacted with an alkali metal, the reaction may be carried out under atmospheric pressure.

The alkali metal salt of the primary amine may be diluted with an inert solvent (e. g. toluene, xylene, an excess of the corresponding free amine itself, etc.) if desired, so as to maintain a relatively thin mixture or solution thereof. The reaction mixture is then stirred and the desired ketone slowly contacted therewith; the reaction mixture being maintained, preferably, at a temperature between about 50° and about 200° C., although the reaction will proceed smoothly at any temperature between about 0° C. and the decomposition point of the reacting materials. If the reacting mixture is maintained at a temperature below about 50° C., the reaction proceeds slowly, though smoothly. The maintenance of a reaction temperature above 200° C. is unnecessary. If the reaction temperature maintained is higher than the boiling point of any component of the reaction mixture, the reaction must, obviously, be carried out under superatmospheric pressure. Otherwise, it may be carried out under atmospheric pressure, but preferably in the presence of a substantially inert atmosphere, e. g. hydrogen, nitrogen, saturated hydrocarbon vapors, etc. The reaction, usually, is practically completed after heating at the above mentioned temperature for a period of about one hour, but longer heating may sometimes be required.

If the imide product is one formed from a diaryl ketone, the reacted mixture may be extracted with water to remove alkali metal hydroxide therefrom, dried, and fractionally distilled to separate the imide product in purified form. As alternative procedure, the product may be separated through dissolving the reaction mixture in a suitable solvent (e. g. methyl alcohol, ethyl alcohol, acetone, benzene, toluene, etc.) and crystallizing the product from the resultant solution. The physical properties (e. g. boiling points and solubilities in organic solvents) of such imide products may vary widely from one compound to another, so that the exact procedure to be followed in separating an imide, from the reaction mixture in which it is formed, must be suited to the specific properties of the imide to be separated. The above mentioned steps or combinations of such steps may, however, ordinarily be employed successfully in separating such products.

If the imide product is one formed from a ketone having either one or two alkyl groups linked with the carbonyl radicle, said product is unstable in the presence of water or strong hydrolyzing agents and care must be exercised in separating the same from the reaction mixture. In recovering such product from a reaction mixture, we find it convenient to add a substantially anhydrous and preferably weak acid (such as acetic acid, oxalic acid, benzoic acid, etc.) or an acid reacting salt, e. g. ammonium chloride, to the reacted mixture (in amount substantially equivalent to the quantity of alkali metal hydroxide present) along with sufficient inert solvent (benzene, toluene, petroleum ether, etc.) to form a thin mixture, filter to remove the alkali metal salt of the added acid, and then fractionally distill the filtrate to separate the imide product therefrom. Other procedure, such as fractional crystallization of the imide product from a substantially non-aqueous solvent, such as alcohol, acetone, benzene, etc., may sometimes conveniently be employed in separating an imide of the above described class from the reaction mixture in which it is formed.

The following examples describe in detail several of the various ways in which the principle of our invention may be employed. It is to be understood, however, that said examples are purely illustrative and are not to be construed as a limitation on the invention.

Example 1—Benzophenone Anil

A mixture consisting of 117.5 grams (1.26 moles) of aniline, 11.5 grams (0.5 mole) of metallic sodium, and 0.1 gram of cuprous oxide was stirred and heated to a temperature between about 150° and 175° C. in an atmosphere of hydrogen. Hydrogen was evolved rapidly from the mixture and the sodium was completely dissolved after about one-half hour of heating. The reaction mixture was then cooled to about 100° C., and a solution consisting of 91 grams (0.5 mole) of benzophenone and 100 grams of aniline was gradually added, with stirring, during a half hour period. The mixture was stirred and maintained at 110°–115° C. for an hour longer. The hot reaction mass was then washed with about 1 liter of water to remove sodium hydroxide therefrom. The product crystallized from the mixture upon standing. The latter was cooled to about 10° C. and the crystalline product filtered therefrom, after which the product was recrystallized from carbon tetrachloride. There was obtained 105 grams of benzophenone anil, having the melting point, 114° C. The yield was about 82 per cent of theoretical, based on the quantity of benzophenone employed.

Example 2—Para-chlorobenzophenone anil

Through procedure similar to that described in Example 1, sodium anilide was prepared by heating a mixture, consisting of 235 grams (2.5 moles) of aniline, 23 grams (1.0 mole) of sodium, and 0.2 gram of cuprous oxide, at 160° to 170° C. during a 1 hour period. The reaction mixture was then cooled to, and maintained at, a temperature between about 85° and about 110° C. while a solution consisting of 217 grams (1.0 mole) of para-chlorobenzophenone and 100 grams of aniline was gradually added thereto, with stirring, during a 15 minute period. The mixture was stirred and maintained at about 110° C. for an additional hour. The reacted mixture was then diluted with 400 cubic centimeters of monochlorobenzene and the diluted mixture was washed with water and filtered. All monochlorobenzene, unreacted aniline, and unreacted para-chlorobenzophenone was then distilled from the mixture, there remaining 253.2 grams of product as residual material. A portion of the product was distilled under vacuum, the boiling point being about 190–193° C. at 2 milimeters pressure. The distillate was recrystallized from about 10 times its weight of ethyl alcohol. The product consisted of fine yellow crystals melting at about 64.2 to 64.5° C. The yield of crude product was about 87 per cent of theoretical, based on the quantity of para-chlorobenzophenone used. The imide product has probably the formula:—

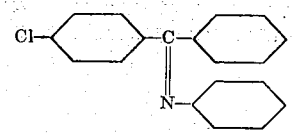

Example 3—Alpha-naphthylimide of benzophenone

The sodium salt of alpha-naphthylamine was prepared by heating a mixture, consisting of 179 grams (1.25 moles) of alpha-naphthylamine, 11.5 grams (0.5 mole) of sodium, and 0.2 grams of cuprous oxide, to between 205° and 210° C. in an atmosphere of hydrogen for a period of 2 hours. The reaction mixture was then cooled to about 130° C., stirred, and 91 grams (0.5 mole) of benzophenone was gradually added thereto during a period of 20 minutes. The mixture was then heated to, and maintained at, 150° C. for 10 minutes. The reaction mass was next washed with hot water, dissolved in 200 cubic centimeters of boiling ethyl alcohol, and the product crystallized from the resulting solution. There was obtained 135.5 grams of fine, yellow crystals of benzophenone naphthylimide, having probably the formula:—

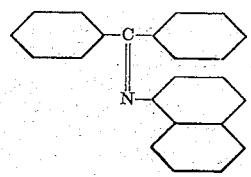

and melting at about 135–136° C. The yield was 88.5 per cent of theoretical, based on the quantity of benzophenone used.

Example 4—Alpha-naphthylimide of para-chlorobenzophenone

Through procedure similar to that described in Example 3, the sodium salt of alpha-naphthylamine can be reacted with substantially its molecular equivalent of para-chlorobenzophenone to form the alpha-naphthylimide of para-chlorobenzophenone. The product is conveniently purified through fractional crystallization from ethyl alcohol. The purified product is obtained as a yellow powder, melting at about 159–160° C., and having probably the formula:—

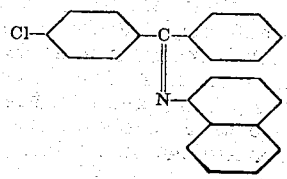

Example 5—Ortho-diphenylimide of benzophenone

A mixture, consisting of 131.5 grams (0.778 mole) of 2-amino-diphenyl, 7.15 grams (0.31 mole) of sodium, and 0.2 grams of cuprous oxide, was stirred and heated to 180–230° C. during a period of 1 hour, the mixture being maintained in contact with an atmosphere of hydrogen during the course of such treatment. The mixture was stirred and maintained within the above mentioned temperature range and 56.4 grams (0.31 mole) of benzophenone was added thereto during a period of about 10 minutes. Heating was continued for an additional 20 minutes, after which the mixture was cooled, diluted with about 400 cubic centimeters of benzene, and the resultant solution was washed thoroughly with water. The benzene solution was then fractionally distilled to separate the desired product therefrom. There was collected 79.2 grams of product, boiling, for the most part, at about 228–230° C. under 2 millimeters pressure. The yield was about 77 per cent of theoretical, based on the quantity of benzophenone employed. The product, after being recrystallized once from a monochlorobenzene-alcohol solution, consisted of fine, bright yellow crystals, melting at about 120° C., and having probably the formula:—

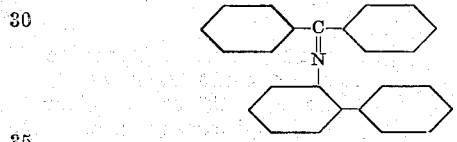

Example 6—Acetophenone anil

Sodium anilide was prepared through heating a mixture consisting of 116 grams (1.25 moles) of aniline, 5.75 grams (0.25 mole) of sodium, and 0.2 grams of cuprous oxide to about 150° C. during a 20 minute period, the mixture being contacted with an atmosphere of hydrogen during a reaction period. The mixture was then cooled to about 100° C. and 30 grams (0.25 mole) of acetophenone was added, with stirring, during a 15 minute period. The mixture was heated at about 125° C. for an additional 10 minutes, after which it was diluted with 200 cubic centimeters of toluene and cooled to about 10° C. The cold solution was stirred and a solution consisting of 15.5 grams (0.25 mole) of glacial acetic acid and 20 cubic centimeters of toluene was added slowly during a 20 minute period. The precipitated sodium acetate was removed through filtration and the filtrate was distilled to remove toluene and unreacted aniline therefrom. The residue from the distillation was recrystallized from petroleum ether, there being obtained, thereby, 18.3 grams of crystalline acetophenone anil. The anil product consists of a fine yellow powder having a melting point of about 37° C. and having probably the formula:—

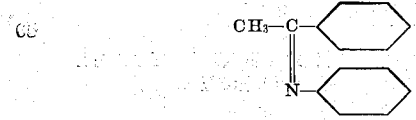

The yield was about 38 per cent of theoretical, based on the quantity of acetophenone used.

The principle of our invention may be practiced in ways other than those specifically described in the examples. In place of the alkali metal salts of primary amines, employed as reactants in forming imides according to the method herein described, the corresponding calcium salts may be employed; such calcium salt may be prepared by stirring and heating a primary amine with metallic calcium at a temperature above about 150° C. and preferably in a substantially inert atmosphere. Due to the relatively high melting point of calcium, the reaction of forming such calcium salt proceeds slowly. We prefer, therefore, to employ an alkali metal salt of a primary amine as a reactant in forming imides according to our method.

Instead of the specific aromatic ketones disclosed in the examples, other aromatic ketones such as the di-biphenyl ketones, phenyl naphthyl ketones, etc., may be reacted according to our method to form imides thereof. Halogenated aromatic ketones (i. e. aromatic ketones bearing either iodine, bromine, or chlorine substituents in any of the possible positions in the aromatic nuclei thereof) may likewise be reacted to form imides without disturbing the halogen substituents. For instance, phenyl-1-bromo-4-naphthyl ketone may be reacted with sodium anilide to form the corresponding brominated anil. Through our method we have prepared a new class of organic compounds having the general formula:—

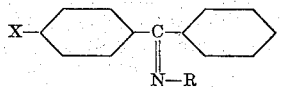

wherein X represents a halogen group and R represents an aromatic residue of the benzene or naphthalene series. Such new compounds are particularly valuable as intermediates in forming certain new rubber antioxidants.

In place of aromatic ketones, we may, by observing proper precautions in separating the imide product from the reaction mixture, form imides of alkyl ketones, e. g. acetone, dimethyl ketone, methyl ethyl ketone, etc. The reaction is general to all ketones which do not contain highly reactive substituent groups, e. g. nitro group, hydroxy groups, acid groups, etc. which would react with the metallic amide. Furthermore, the alkali metal or calcium salt of any primary amine may be employed successfully as a reactant in forming imides according to our method. We may, for instance, employ either the sodium, potassium, or calcium salts of alkyl amines, such as monomethyl-amine, mono-ethylamine, etc., or of aralkylamines, such as benzylamine, omega-aminopropylbenzene, etc., in forming imides according to our new method. The only restriction on the kind of primary amine which may be used, is that it must be capable of reacting with an alkali metal (e. g. sodium or potassium) or calcium to form the necessary alkali metal or calcium salt as a reactant.

The present invention, briefly, comprises reacting a ketone with an alkali metal salt of a primary amine to form the corresponding imide of the ketone.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method of making an imide of a ketone which comprises reacting a ketone with a primary amine salt having the general formula:—

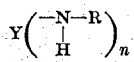

wherein Y represents a metal selected from the class consisting of the alkali metals and calcium, R represents a group selected from the class consisting of alkyl, aryl, and aralkyl groups, and $n$ is the number 1 or 2.

2. The method of making an imide of a ketone which comprises reacting a ketone with an alkali metal salt of a primary amine at a temperature between about 0° and about 200° C. in the presence of a substantially inert solvent.

3. The method of making an imide of an aromatic ketone which comprises reacting an aromatic ketone with an alkali metal salt of a primary amine.

4. The method of making an imide of an aromatic ketone which comprises heating an aromatic ketone with an alkali metal salt of a primary amine to a temperature between about 50° and about 200° C. in the presence of a substantially inert solvent.

5. The method of making an imide of a diaryl ketone which comprises reacting a diaryl ketone with an alkali metal salt of a primary amine.

6. The method of making an arylimide of a diaryl ketone which comprises reacting a diaryl ketone with an alkali metal salt of a primary aromatic amine.

7. In a method of making an arylimide of a diaryl ketone, having the general formula:—

wherein R, R', and R" represent aromatic groups, the step which consists in reacting a diaryl ketone with a sodium salt of a primary aromatic amine, the reaction being carried out at a temperature between about 50° and about 200° C., and in the presence of a substantially inert solvent.

8. In a method of making an arylimide of a diaryl ketone having the general formula:—

wherein R, R', and R" represent aromatic groups of the benzene or naphthalene series, the steps which consist in reacting a diaryl ketone of the benzene or naphthalene series with a sodium salt of a primary aromatic amine of the benzene or naphthalene series, the reaction being carried out at a temperature between about 50° and about 200° C. and in the presence of a substantially inert solvent, and separating the imide product from the reaction mixture.

9. In a method of making an arylimide of a diaryl ketone having the general formula:—

wherein R, R', and R" represent aromatic groups of the benzene or naphthalene series, the steps which consist in reacting a diaryl ketone of the benzene or naphthalene series with a sodium salt of a primary aromatic amine of the benzene or naphthalene series, the reaction being carried out at a temperature between about 50° and about 200° C. and in the presence of a substantially inert solvent, extracting the reacted mixture with water, and fractionally distilling the mixture to separate the imide product therefrom.

10. In a method of making an imide of a ketone having the general formula:—

wherein R' represents an alkyl group and R and R" represent groups selected from the class consisting of alkyl, aryl, and aralkyl groups, the steps which consist in treating a substantially anhydrous solution containing such imide and an alkali metal hydroxide with that quantity of a substantially anhydrous acid required to neutralize the alkali metal hydroxide, and filtering the precipitated alkali metal salt of said acid from the mixture.

11. The method of making an imide of a halogenated aromatic ketone which comprises reacting a halogenated aromatic ketone with substantially its chemical equivalent of a metal salt of a primary amine, said salt having the general formula:—

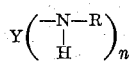

wherein Y represents a metal selected from the class consisting of calcium and the alkali metals and R represents a group selected from the class consisting of alkyl, aryl, and aralkyl groups, and $n$ is the number 1 or 2.

12. As a new compound, an imide of a ketone, having the general formula:—

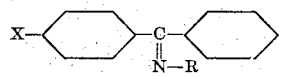

wherein X represents a halogen substituent and R represents an aromatic group of the benzene or naphthalene series.

13. As a new compound, para-chlorobenzophenone anil, having probably the formula:—

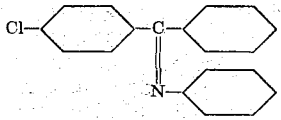

and melting at about 64.2 to 64.5° C.

14. As a new compound, the alpha-naphthylimide of para-chlorobenzophenone, having probably the formula:—

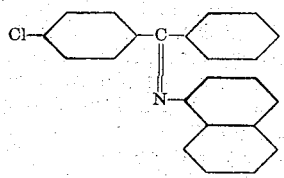

and melting at about 159–160° C.

EDGAR C. BRITTON.
FRED BRYNER.